Sept. 22, 1953　　　A. R. KITTLESON　　　2,653,155
MANUFACTURE OF N-TRICHLOROMETHYLTHIO IMIDES
Filed April 21, 1951
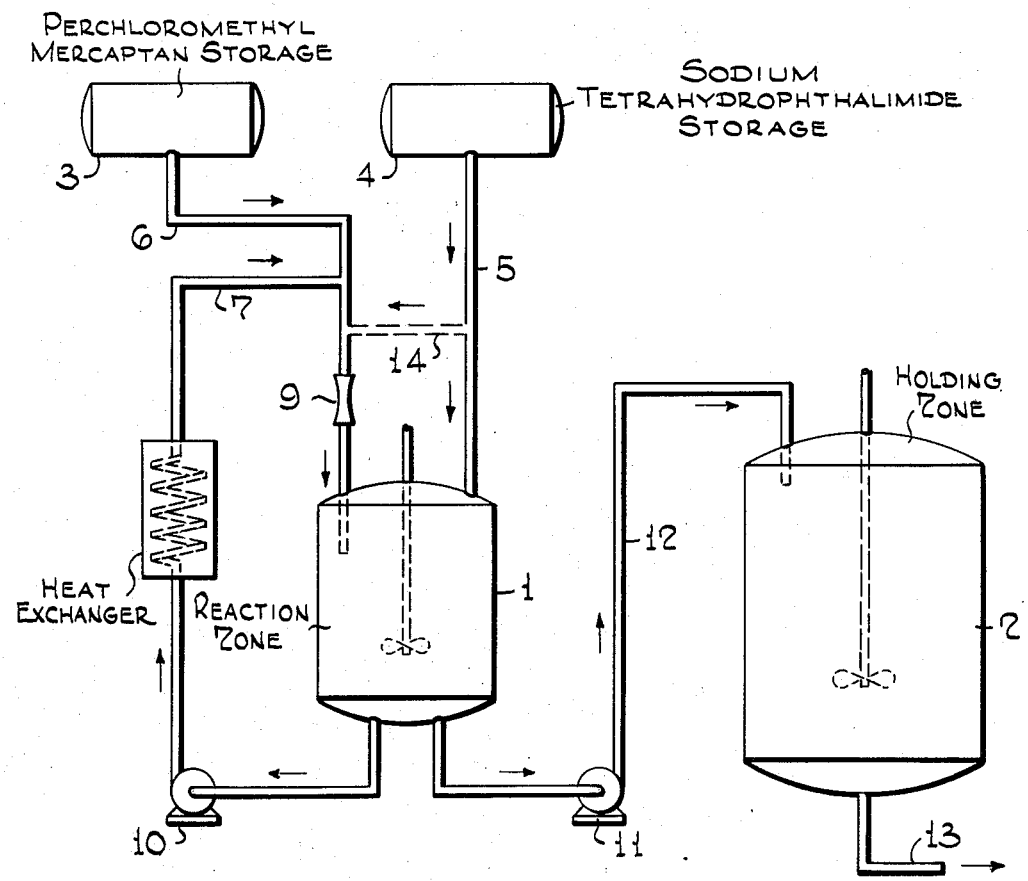
Allen R. Kittleson Inventor
By Henry Berk Attorney

UNITED STATES PATENT OFFICE 2,653,155

MANUFACTURE OF N-TRICHLOROMETHYL-THIO IMIDES

Allen R. Kittleson, Cranford, N. J., assignor to Standard Oil Development Company, a corporation of Delaware Application April 21, 1951, Serial No. 222,260

3 Claims. (Cl. 260—326)

This invention relates to new and useful improvements in the preparation of N-trichloromethylthio imides and more particularly to improved methods for the obtaining of higher yields of N-trichloromethylthio imides.

This application is a C. I. P. of U. S. application Serial No. 50,888, filed September 23, 1948, now U. S. Patent No. 2,553,771.

N-trichloromethylthio imides are compounds in which the >NSCCl₃ group is linked to two acyl groups. The phrase "acyl group" refers to groups of the following character $$-C-C\overset{O}{\underset{}{\nwarrow}}$$

$$-C-S\overset{O}{\underset{O}{\nwarrow}}$$

etc. (see Hackh, "Chemical Dictionary," second edition, page 21). The compounds are thus properly regarded as N-trichloromethylthio imides (or N-thiotrichloromethyl imides) (see Sidgewick's "Organic Chemistry of Nitrogen," 1937 edition, pages 136 and 152).

The imide compounds of the indicated type are illustrated by Formula I:

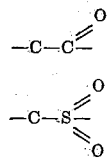

Formula I in which R represents an organic radical, nucleus or one or more organic residues and X is part of an acyl group, such as for example

and

The R may be aliphatic, aromatic, alicyclic, heterocyclic, and their substituted derivatives.

These compounds have been prepared by the general method disclosed in U. S. application Serial No. 50,888, of dissolving the desired imide in aqueous alkaline solution followed by addition of about an equal molecular quantity of perchloromethyl mercaptan. The mixture was stirred rapidly, conveniently until the aqueous medium became acid to litmus, then the precipitated product was filtered and air dried, in essentially a batch process.

That process is subject to certain difficulties. The pH of a 10–20% aqueous solution of sodium tetrahydrophthalimide is 11.6–11.7. N-trichloromethylthio tetrahydrophthalimide (the reaction product of sodium tetrahydrophthalimide and perchloromethyl mercaptan) in a medium of this high pH is subject to some decomposition with a resulting loss in yield of product. In addition, the process of decomposition of the product neutralizes approximately 5 equivalents of sodium imide to the free imide which will not react with perchloromethyl mercaptan. Evidence for this decomposition is shown by an experiment wherein 30.2 g. (0.2 mole) of pure tetrahydrophthalimide and 8 g. (0.2 mole) of sodium hydroxide were added to 133 cc. of distilled water at 20° C. When solution of the sodium imide was complete 10 g. of powdered N-trichloromethylthio tetrahydrophthalimide was added. While stirring, pH readings were taken at intervals as a measure of the neutralization of sodium imide at the expense of N-trichloromethylthio tetrahydrophthalimide. These follow:

| Time (min.) | pH |
|---|---|
| 0 | 11.7 |
| 3 | 11.6 |
| 5 | 11.52 |
| 11 | 11.45 |
| 15 | 11.35 |
| 20 | 11.3 |
| 25 | 11.25 |

9.5 g. of N-trichloromethylthio tetrahydrophthalimide was recovered, indicating that 5% of the product had been decomposed. This undesirable side reaction also makes it necessary to thoroughly remove essentially all of the N-trichloromethylthio-tetrahydrophthalimide precipitate from the reactor prior to charging caustic and tetrahydrophthalimide for the succeeding run.

A second important factor is the decomposition, by hydrolysis, of sodium tetrahydrophthalimide to its mono acid amide salt. The rate of this hydrolysis becomes significant at the preferred temperature of reaction (20° C.) as may be seen from the following data. A 20% aqueous solution of sodium tetrahydrophthalimide is decomposed at the following rate:

| Temp., ° C. | Time (Hrs.) | Percent Decomposition |
|---|---|---|
| 3 | .5 | 3 |
|  | 10 | 6 |
| 20 | 2 | 10 |
|  | 5 | 21 |
| 40 | 1 | 25 |
|  | 2 | 42 |

The present invention is an improved method of making N-trichloromethylthio imides, which overcomes all the before-mentioned difficulties. The method is a continuous process for preparing N-trichloromethylthio imides which comprises regulating the concentrations and residence time of the reactants in a cooled reaction zone or series of reaction zones, so that a pH in the narrow range of 10.0 to 10.5 is maintained in the reaction zone or series of reaction zones. The resulting reaction mixture is then withdrawn to a holding zone which is larger than any of the reaction zones, wherein the reaction mixture resides until it is approximately neutral or preferably at a pH of 8 to 8.5. The product is then withdrawn in a slurry form. This method overcomes all the beforementioned difficulties which are inherent in a batch process.

Because perchloromethyl mercaptan and alkali metal imides react in equimolar amounts illustrated by Formula II below where M represents an alkali metal

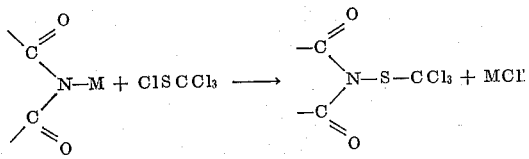

Formula II it is preferred to utilize these reactants in stoichiometrical amounts. The pH is then controlled in the reaction zone or series of reaction zones principally by controlling the rate of flow of the perchloromethyl mercaptan and sodium imide solution into the reaction zone. These two preferably enter the zone in stoichiometrical amounts and the withdrawal rate of the reaction mixture is approximately the sum of the rate of entry of the two reactant streams (or the same as the entrant stream if the reactants are combined into one stream prior to reaching the reaction zone. The withdrawal rate may also be the sum of more than two streams, as where several points of entry are utilized). The reduction of the pH due to the inter-action of alkali metal imides with perchloromethyl mercaptan as shown in Formula II above is a function of time, which in turn is a function of the rates of flow and other points discussed above. Thus, for example, the entire reaction may be completed in from 10 to 40 minutes with good removal of the heat of reaction. The pH in the reaction zones or single reaction zone is maintained between 10.0 to 10.5 and the temperature is maintained between 10 to 30° C. by cooling the exothermic reaction system.

The alkali metal imide aqueous solutions employed may be prepared by dissolving the alkali metal imide in water or they may be formed by dissolving the desired imide in an aqueous alkaline solution of an alkali metal compound. The metal compound used to supply the necessary alkaline solution is a compound of an alkali metal such as lithium, sodium and potassium, and the like. Because of cost factors, sodium and potassium are preferred. The alkali is present preferably in amounts equivalent to the imide used. While other basic compounds may be used, it is desirable to use the alkali metal hydroxides because of the consequent avoidance of the presence of other anion radicals which might have to be removed. Concentrations of the alkali metal imide of about 20% are conveniently employed. When the alkali metal imide is prepared from the alkali metal hydroxide as indicated, the imide can be prepared at a lower temperature, e. g., 0° C., than is employed in the synthesis of the final product. The lower temperature prevents hydrolysis of the alkali metal imide.

The pH in the larger holding zones, by control of the residence time, goes down to about neutral. Actually the reaction is very close to completion when a pH of 8.0 to 8.5 is obtained and the product can be withdrawn as a slurry at that point. The temperature in the holding zones is maintained between 10 to 30° C., preferably 20° C. The holding zone, in so far as it permits the reaction to proceed further towards completion, is also a reaction zone, but it of necessity is larger than any of the reaction zones or zone.

This invention will be better understood by reference to the flow diagram shown in the accompanying drawing.

In the drawing 1 represents the cooled reaction zone and 2 indicates the larger holding zone. Perchloromethyl mercaptan is charged from storage tank 3 through line 6 and venturi 9 into reaction zone 1, which preferably has a non-corrosive surface, e. g., stainless steel, nickel, glass, etc. An aqueous solution of sodium tetrahydrophthalimide is fed from storage tank 4 through line 5 into reaction zone 1. Line 5 can feed into line 14 so that the aqueous tetrahydrophthalimide is admixed with the perchloromethyl mercaptan prior to entrance to the reaction zone. The reaction mixture is stirred vigorously in reaction zone 1, which is cooled so as to maintain the temperature in the range of 10 to 30° C. and preferably about 20° C. A portion of the reaction mixture is recirculated through line 7 operated by pump 10 through heat exchanger 8 back to line 6. This results in the water insoluble perchloromethyl mercaptan mixing with the rapidly-circulating aqueous reaction slurry. The withdrawn reaction mixture is pumped through line 12 by pump 11 into holding zone 2. The total rate of entry of the reactants through lines 5 and 9 and the withdrawal of the reaction mixture through line 11 and approximately equal, as explained above. These rates of entry and withdrawal are regulated so that a pH in the reaction zone is maintained in the range of from 10 to 10.5.

The reaction mixture is stirred vigorously in larger holding zone 2, which is cooled to a temperature in the range of 10 to 30° C., preferably 20° C., until virtually all of the alkali metal imide is neutralized or until the pH is in the range of 8 to 8.5. The aqueous slurry of N-trichloromethylthio tetrahydrophthalimide is withdrawn continuously through line 13 for filtration, washing and drying.

The method of this invention, i. e., regulating the pH, is also ideally adapted for the preparation of N-trichloromethylthio imides other than those of dicarboxylic acids, e. g. (N-trichloromethylthio) o-sulfobenzimide, etc. The method of this invention can also advantageously be employed for the preparation of N-trichloromethylthio amides, sulfonamides, and related compounds.

It is to be understood that the invention is not limited to the specific examples which have been offered merely as illustrative and that modifications may be made without departing from the spirit of the invention.

What is claimed is:

1. A process for the preparation of an N-trichloromethylthio imide corresponding to the formula

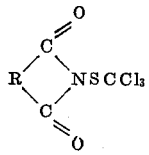

wherein R is a hydrocarbon nucleus which comprises the steps of feeding an aqueous solution of an alkali metal imide of a dicarboxylic acid and perchloromethyl mercaptan into at least one reaction zone; maintaining a temperature of 10 to 30° C. in said reaction zone; admixing the perchloromethyl mercaptan with the alkali metal imide; regulating the rate of flow of the perchloromethyl mercaptan and alkali metal imide into and the withdrawal of the resultant reaction mixture from the reaction zone so that a pH of 10.0 to 10.5 is maintained therein; withdrawing the reaction mixture to a holding zone, said holding zone being larger than any reaction zone; mixing the reaction mixture which is retained in the holding zone until the reaction mixture has a pH in the range of 7 to 8.5, and withdrawing a slurry of the N-trichloromethylthio imide from the holding zone.

2. A process for the preparation of an N-trichloromethylthio imide corresponding to the formula

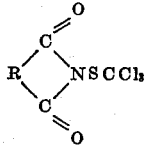

wherein R is a hydrocarbon nucleus which comprises the steps of feeding an aqueous solution of an alkali metal imide of a dicarboxylic acid and a stoichiometrical amount of perchloromethyl mercaptan into at least one reaction zone; maintaining a temperature of 10 to 30° C. in said reaction zone; admixing the perchloromethyl mercaptan with the alkali metal imide; adjusting the rate of flow of the perchloromethyl mercaptan and alkali metal imide and the withdrawal of the resulting reaction mixture from the reaction zone so that a pH of 10.0 to 10.5 is maintained therein; withdrawing the reaction mixture to a holding zone, said holding zone being larger than any reaction zone; mixing the reaction mixture which is retained in the holding zone until all the reaction mixture is in the range of 8 to 8.5, and withdrawing a slurry of the N-trichloromethylthio imide from the holding zone.

3. A process as in claim 2 in which the N-trichloromethylthio imide is N-trichloromethylthio tetrahydrophthalimide and the alkali metal imide is sodium tetrahydrophthalimide.

ALLEN R. KITTLESON.

References Cited in the file of this patent

UNITED STATES PATENTS

| Number | Name | Date |
|---|---|---|
| 2,553,776 | Kittleson | May 26, 1951 |